United States Patent
Kuen et al.

(10) Patent No.: US 12,494,049 B2
(45) Date of Patent: Dec. 9, 2025

(54) OPEN VOCABULARY INSTANCE SEGMENTATION

(71) Applicant: ADOBE INC., San Jose, CA (US)

(72) Inventors: Jason Wen Yong Kuen, Santa Clara, CA (US); Dat Ba Huynh, Boston, MA (US); Zhe Lin, Clyde Hill, WA (US); Jiuxiang Gu, Baltimore, MD (US)

(73) Assignee: ADOBE INC., San Jose, CA (US)

( * ) Notice: Subject to any disclaimer, the term of this patent is extended or adjusted under 35 U.S.C. 154(b) by 467 days.

(21) Appl. No.: 17/650,437

(22) Filed: Feb. 9, 2022

(65) Prior Publication Data
US 2023/0252774 A1    Aug. 10, 2023

(51) Int. Cl.
| | |
|---|---|
| *G06V 10/778* | (2022.01) |
| *G06T 7/11* | (2017.01) |
| *G06T 7/70* | (2017.01) |
| *G06V 10/22* | (2022.01) |
| *G06V 10/764* | (2022.01) |
| *G06V 10/77* | (2022.01) |
| *G06V 10/776* | (2022.01) |
| *G06V 10/82* | (2022.01) |
| *G06V 10/86* | (2022.01) |

(52) U.S. Cl.
CPC ............ *G06V 10/7792* (2022.01); *G06T 7/11* (2017.01); *G06T 7/70* (2017.01); *G06V 10/22* (2022.01); *G06V 10/764* (2022.01); *G06V 10/7715* (2022.01); *G06V 10/776* (2022.01); *G06V 10/82* (2022.01); *G06V 10/86* (2022.01); *G06T 2207/20021* (2013.01); *G06T 2207/20081* (2013.01); *G06T 2207/20084* (2013.01)

(58) Field of Classification Search
CPC .. G06V 10/7792; G06V 10/22; G06V 10/764; G06V 10/7715; G06V 10/776; G06V 10/82; G06V 10/86; G06V 20/70; G06T 7/11; G06T 7/70; G06T 2207/20021; G06T 2207/20081; G06T 2207/20084
USPC ......................................................... 382/157
See application file for complete search history.

(56) References Cited

U.S. PATENT DOCUMENTS

| | | | | |
|---|---|---|---|---|
| 11,430,124 | B2 * | 8/2022 | Li | G06T 7/11 |
| 2021/0312264 | A1 * | 10/2021 | Yang | G06F 17/16 |
| 2021/0366128 | A1 * | 11/2021 | Kim | G06T 7/194 |
| 2022/0101112 | A1 * | 3/2022 | Brown | G10L 15/18 |
| 2022/0188636 | A1 * | 6/2022 | Pham | G06N 3/08 |

(Continued)

OTHER PUBLICATIONS

Gupta, et al., "LVIS: A Dataset for Large Vocabulary Instance Segmentation", 2019 IEEE/CVF Conference on Computer Vision and Pattern Recognition (CVPR), 2019, pp. 5356-5364.

(Continued)

*Primary Examiner* — Jennifer Mehmood
*Assistant Examiner* — Pardis Sohraby
(74) *Attorney, Agent, or Firm* — F. CHAU & ASSOCIATES, LLC

(57) ABSTRACT

Systems and methods for image processing are described. Embodiments of the present disclosure receive a training image and a caption for the training image, wherein the caption includes text describing an object in the training image; generate a pseudo mask for the object using a teacher network based on the text describing the object; generate a mask for the object using a student network; and update parameters of the student network based on the mask and the pseudo mask.

18 Claims, 11 Drawing Sheets

(56) References Cited

U.S. PATENT DOCUMENTS

| | | | |
|---|---|---|---|
| 2022/0366263 A1* | 11/2022 | Ji | G06N 3/088 |
| 2022/0383045 A1* | 12/2022 | Sakhi | G06V 10/764 |
| 2023/0154005 A1* | 5/2023 | Borse | G06T 7/10 |
| | | | 382/100 |
| 2023/0154173 A1* | 5/2023 | Zhang | G06N 3/084 |
| | | | 382/156 |
| 2023/0177810 A1* | 6/2023 | Xu | G06V 10/774 |
| | | | 382/159 |
| 2023/0186429 A1* | 6/2023 | Norouzzadeh | G06T 3/4046 |
| 2024/0095927 A1* | 3/2024 | Huang | G06V 10/25 |

OTHER PUBLICATIONS

Zareian, et al., "Open-Vocabulary Object Detection Using Captions", CVPR, 2021, pp. 14393-14402.

* cited by examiner

OPEN VOCABULARY INSTANCE SEGMENTATION

BACKGROUND

The following relates generally to image processing, and more specifically to instance segmentation using machine learning.

Digital image processing refers to the use of a computer to process or edit a digital image using an algorithm or a processing network. Image processing software is commonly used for image editing, robot navigation, etc. Object detection is an example of an image processing task that identifies and labels objects within an image. In some cases, object detection enables computers to interpret visual information as human beings do. Image processing systems can label images in a dataset based on detected objects.

In some cases, object detection can be combined with other computer vision tasks such as semantic segmentation and instance segmentation. Semantic segmentation refers to the assignment of categories (e.g., vehicle, animal, etc.) to each pixel in an image. Instance segmentation detects multiple objects from the same class as individual instances. For example, multiple cars can be identified within an image.

Recently, deep learning techniques have been used for instance segmentation. However, deep learning-based methods often involve high annotation costs during training and depend on labeling known classes. As a result, these methods are costly to scale to cover a large number of classes. Therefore, there is a need in the art for improved object detection systems that can generalize to unseen classes.

SUMMARY

The present disclosure describes systems and methods for image processing. Embodiments of the present disclosure include an image processing apparatus configured to generate a mask indicating location of an object and a class prediction for the object depicted in an image. In some embodiments, the image processing apparatus includes a teacher network and a student network. The teacher network is pre-trained on an annotated mask dataset by comparing the object classification and the mask to the ground truth object classification and the ground truth mask, respectively. Additionally, the teacher network generates a pseudo mask for an object in a captioned image where the caption includes text describing the object. The student network generates a mask for the object and the student network is trained based on the mask and the pseudo mask generated by the teacher network. The student network is exposed to a relatively large range of classes via pseudo masks and captions describing objects in the image. As a result, the student network trained on cheap caption dataset can efficiently produce class prediction during inference for objects from unseen classes.

A method, apparatus, and non-transitory computer readable medium for training a neural network are described. One or more embodiments of the method, apparatus, and non-transitory computer readable medium include receiving a training image and a caption for the training image, wherein the caption includes text describing an object in the training image; generating a pseudo mask for the object using a teacher network based on the text describing the object; generating a mask for the object using a student network; and updating parameters of the student network based on the mask and the pseudo mask.

A method, apparatus, and non-transitory computer readable medium for image processing are described. One or more embodiments of the method, apparatus, and non-transitory computer readable medium include receiving an image that depicts an object; generating a feature map for the image using a machine learning model, wherein the machine learning model is trained using a pseudo mask generated by a teacher network for a training image based on a caption for the training image; and generating a mask based on the feature map using the machine learning model, wherein the mask indicates a location of the object in the image.

An apparatus and method for training a machine learning model are described. One or more embodiments of the apparatus and method include a teacher network configured to generate a pseudo mask for an object in an image based on text describing the object in the image; a student network configured to generate a mask for the object; and a training component configured to update parameters of the student network based on the mask and the pseudo mask.

DETAILED DESCRIPTION

Figure 1:
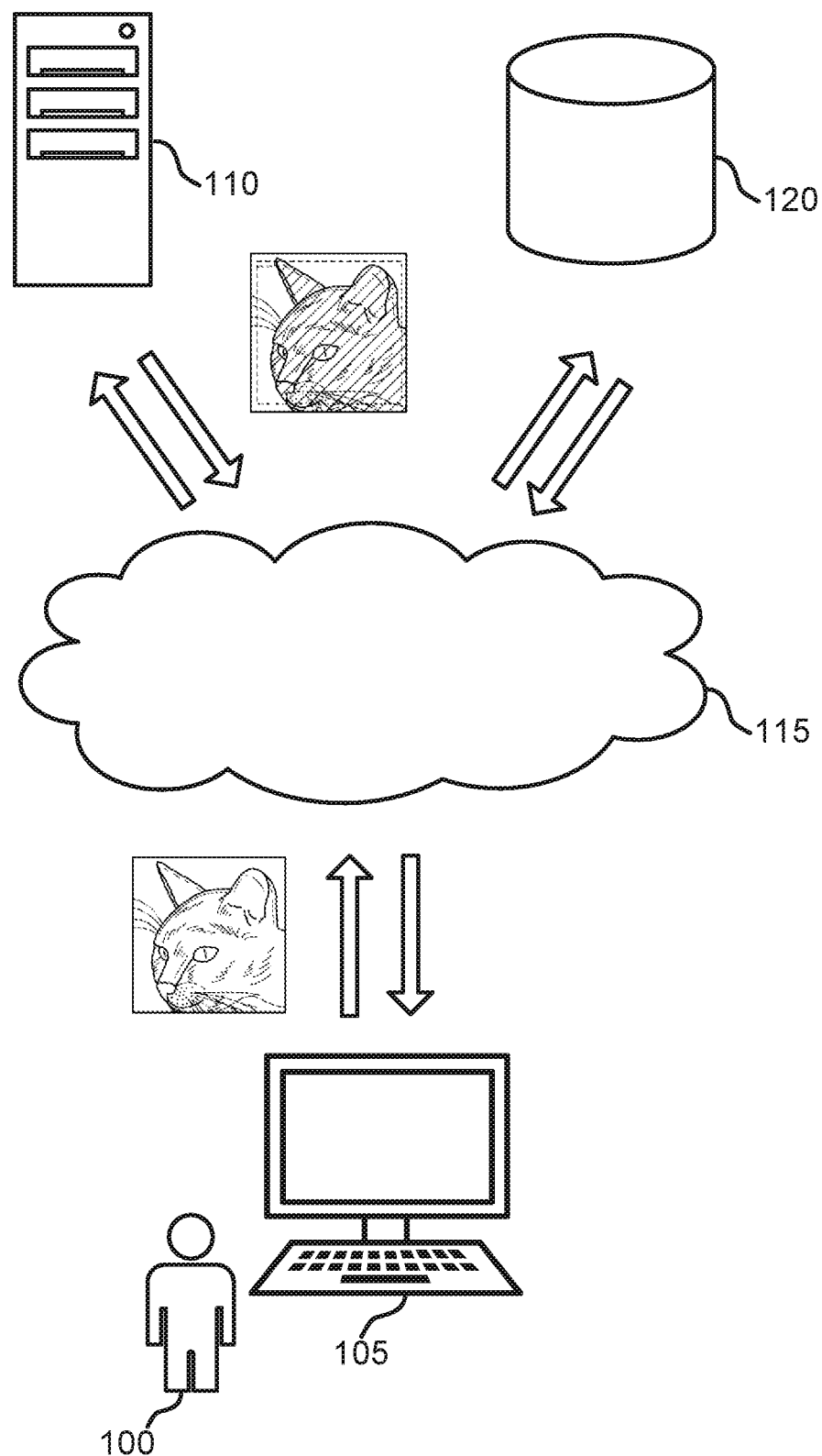
FIG. 1 shows an example of an image processing system according to aspects of the present disclosure.

The present disclosure describes systems and methods for image processing. Embodiments of the present disclosure include an image processing apparatus configured to generate a mask indicating location of an object and a class prediction for the object depicted in an image. In some embodiments, the image processing apparatus includes a teacher network and a student network. The teacher network is pre-trained on an annotated mask dataset by comparing the object classification and the mask to the ground truth object classification and the ground truth mask, respectively. Additionally, the teacher network generates a pseudo mask for an object in a captioned image where the caption includes text describing the object. The student network generates a mask for the object and the student network is trained based on the mask and the pseudo mask generated by the teacher network. The student network is exposed to a relatively large range of classes via pseudo masks for captioned images. As a result, the student network can produce a class prediction during inference for objects from seen and unseen classes depicted in an image.

Image processing systems can perform classification, object localization, semantic segmentation, and instance-level segmentation. An image includes a set of objects. Conventional systems identify and segment each of the objects. In some cases, image segmentation systems are trained based on available mask annotations. Mask annotating is the process of labeling or classifying a mask of an image using labels such as text, annotation tools, etc. Typically, a mask is a region of interest of the image. Mask annotation metadata of images may be manually added by a human annotator. The mask annotations are used to train a machine learning model using supervised learning.

However, mask annotations are costly and not usually available for training an object detection model. The class labels in a dataset are manually added, which requires a significant amount of time. High annotation cost of deep-learning-based instance-level detection models can make these models unsuitable for use in real-world applications such as image processing on mobile devices.

Embodiments of the present disclosure include an image processing network comprising a teacher network and a student network. The teacher network generates a pseudo mask for an object in an image based on text describing the object in the image. In some examples, the teacher network is pre-trained based on a mask dataset having mask annotations. The mask dataset includes a limited number of classes (i.e., known classes). That is, the teacher network's knowledge is limited to base classes of the mask dataset. The teacher network is pre-trained via supervised learning by comparing the object classification and the mask to the ground truth object classification and the ground truth mask, respectively.

By using caption information and pseudo masks generated by the teacher network, embodiments of the present disclosure train a student network to have expanded knowledge than the teacher network (i.e., the student network can detect and segment objects from unseen classes). The student network generates a mask for the object in the image. The student network is trained using a detection loss based on the pseudo mask and the mask. The teacher network translates high-level caption information (e.g., text describing an object in an image) into pixel-wise mask information and guides the training of the student network using captioned images and pseudo masks. Accordingly, the student knowledge is expanded to a relatively large range of classes as appeared in the caption information that are otherwise not available in mask annotation datasets. In some embodiments, the image processing network collects mask exemplars which are exemplary features for an object. These mask exemplars help capture visual details missing from word embeddings of the caption information and show high mask consistency and prediction confidence across the captioned images.

Embodiments of the present disclosure may be used in the context of image editing applications. For example, an image processing network based on the present disclosure may take an image that depicts an object and efficiently generate a mask that indicates a location of the object in the image and class prediction for the object. An example application of the inventive concept in the image editing context is provided with reference to FIGS. 1-3. Details regarding the architecture of an example image processing apparatus are provided with reference to FIGS. 4-5. Example processes for image processing are provided with reference to FIGS. 6-7. Example training processes are described with reference to FIGS. 8-11.

Image Editing Application

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 4.

In the example of FIG. 1, user 100 provides an image depicting an object via user device 105. In some examples, the object in the image is a cat. User 100 communicates with image processing apparatus 110 via user device 105 and cloud 115. User device 105 transmits the image to image processing apparatus 110. Image processing apparatus 110 generates a mask where the mask indicates a location of the target object (i.e., cat) of the image. In this example, the mask is represented by the shading over the cat. Additionally, image processing apparatus 110 generates a class prediction for the object via bounding box and label. The bounding box is represented by the dashed-line box. Image processing apparatus 110 returns the mask, the bounding box identifying the target object (i.e., cat) and the class prediction to user 100.

User device 105 may be a personal computer, laptop computer, mainframe computer, palmtop computer, personal assistant, mobile device, or any other suitable processing apparatus. In some examples, user device 105 includes software that incorporates an image processing application (e.g., image editing application). In some examples, the image editing application on user device 105 may include functions of image processing apparatus 110. That is, image processing apparatus 110 may be implemented on user device 105.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Image processing apparatus 110 receives an image that depicts an object. Image processing apparatus 110 generates a feature map for the image using a machine learning model, wherein the machine learning model is trained using a pseudo mask generated by a teacher network for a training image based on a caption for the training image. Image processing apparatus 110 generates a mask based on the feature map using the machine learning model, wherein the mask indicates a location of the object (e.g., cat) in the image.

Image processing apparatus 110 returns the mask or masked image to user 100. Additionally, image processing apparatus 110 generates a class prediction for the object for user 100 and returns the class prediction to user 100. The process of using image processing apparatus 110 is further described with reference to FIG. 2.

Image processing apparatus 110 includes a computer implemented network comprising a teacher network, a student network, and an image editing application. In some examples, image processing apparatus 110 further includes a text encoder, a mapping component, and a region proposal network. Detail regarding various network components will be described in FIG. 4.

Image processing apparatus 110 may also include a processor unit, a memory unit, an I/O module, and a training component. The training component is used to train a machine learning model (or an image processing network). Additionally, image processing apparatus 110 can communicate with database 120 via cloud 115. In some cases, the architecture of image processing network is also referred to as a network or a network model. Further detail regarding the architecture of image processing apparatus 110 is provided with reference to FIGS. 4-5. Further detail regarding the operation of image processing apparatus 110 is provided with reference to FIGS. 6-7.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with a database controller. In other cases, a database controller may operate automatically without user interaction.

Figure 2:
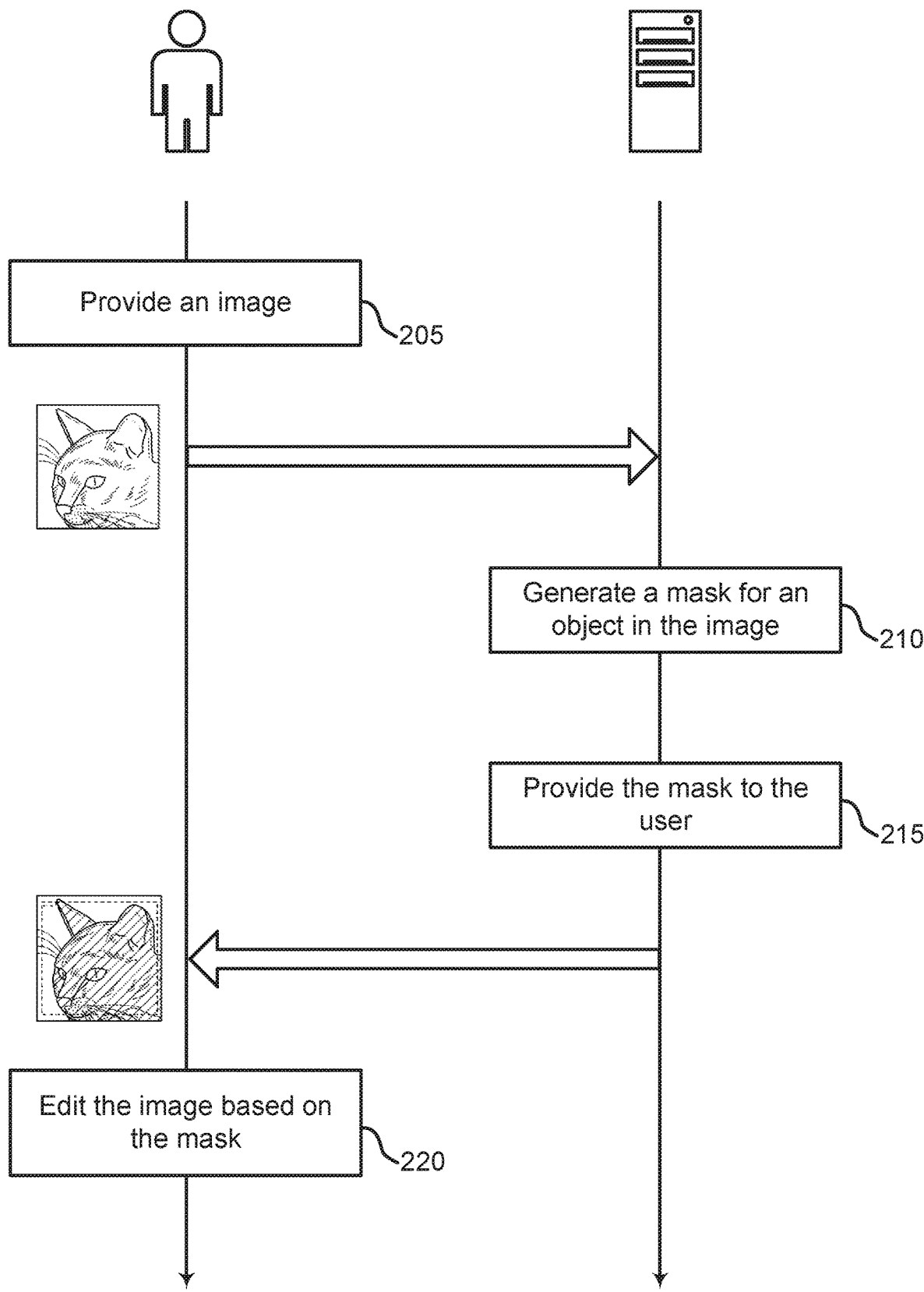
FIG. 2 shows an example of editing an image according to aspects of the present disclosure.

FIG. 2 shows an example of editing an image according to aspects of the present disclosure. For example, the method may be performed by user 100 interacting with image processing apparatus 110 via user device 105 as described with reference to FIG. 1. In some examples, these operations are performed by a system including a processor executing a set of codes to control functional elements of an apparatus. The image processing apparatus can be implemented on a mobile device to perform image editing. A user uploads an original image depicting an object. The image processing apparatus returns a mask and class prediction corresponding to the object in the image. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides an image. In some cases, the operations of this step refer to, or may be performed by, user as described with reference to FIG. 1. The user can take a photograph or select an image using a mobile device.

At operation 210, the system generates a mask for an object in the image. In some cases, the operations of this step refer to, or may be performed by, image processing apparatus as described with reference to FIGS. 1 and 4. One or more objects in the image can be detected using a student network. As an example, the student network can identify the object as a cat and generate a mask indicating the location of the cat.

At operation 215, the system provides the mask to the user. In some cases, the operations of this step refer to, or may be performed by, image processing apparatus as described with reference to FIGS. 1 and 4. In some examples, the system also provides a bounding box with a label indicating the class of the object (i.e., cat). If there are multiple cats in the image, the system may also identify and segment each instance of the objects and associate each instance with a class label.

At operation 220, the system edits the image based on the mask. In some cases, the operations of this step refer to, or may be performed by, user as described with reference to FIG. 1. The user edits the image based on the object detection information (e.g., mask, bounding box, class label prediction). For example, the user can edit the image using an image editing application on a mobile device.

Figure 3:
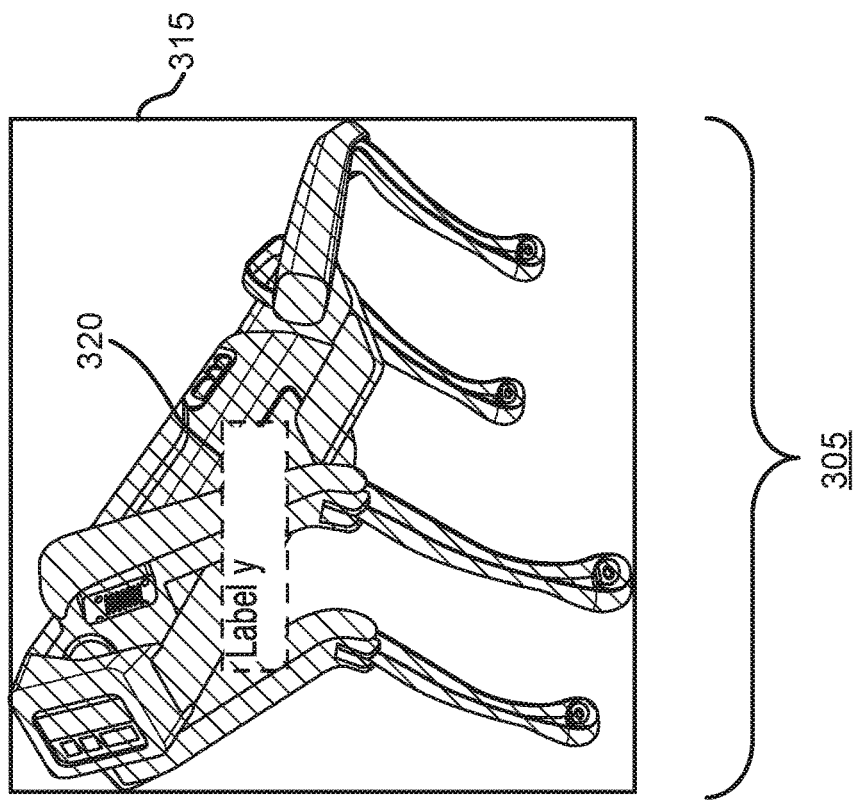
FIG. 3 shows an example of object identification according to aspects of the present disclosure.
Figure 3:
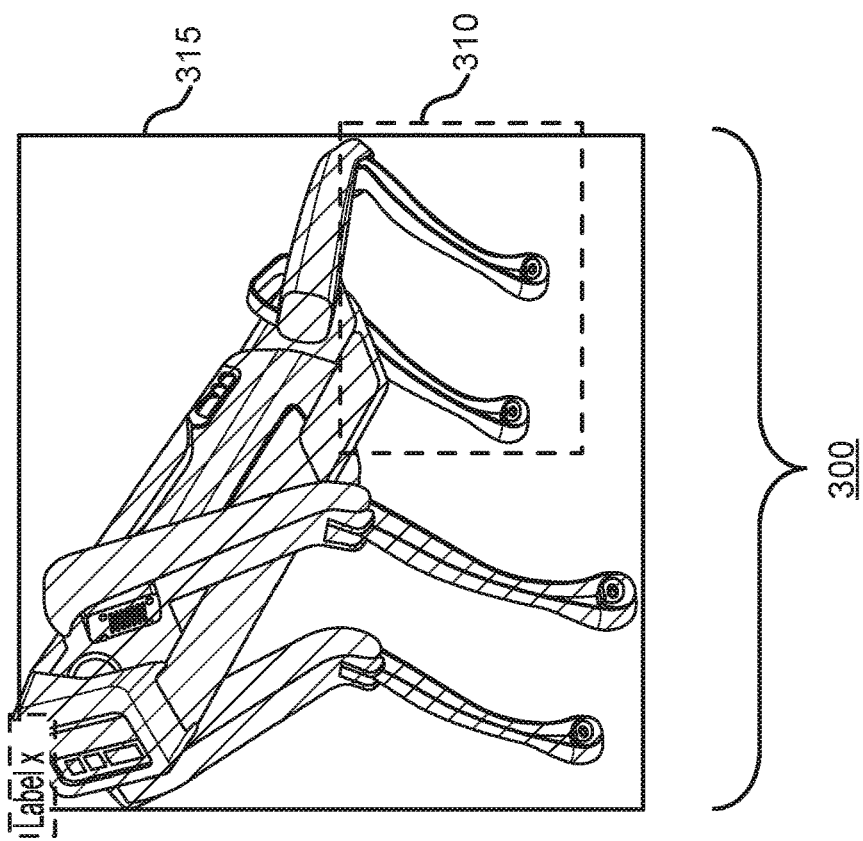

FIG. 3 shows an example of object identification according to aspects of the present disclosure. Image processing apparatus described in FIG. 1 can identify and segment an object that is unseen in a mask annotation dataset. The mask annotation dataset includes a limited number of base classes. The example shown includes traditional system 300, image processing apparatus 305, unlabeled portion 310, bounding box 315, and label 320. Bounding box 315 is an example of, or includes aspects of, the corresponding element described with reference to FIG. 10. As illustrated in FIG. 3, traditional system 300 cannot identify an object or a portion of an object in an image (i.e., there exists at least an unlabeled portion 310). For example, the object (e.g., robot) is an object from an unseen class during inference (i.e., robot is not a class seen during training). Traditional system 300 is not able to label the object. However, image processing apparatus 305 of the present disclosure accurately identifies and labels the object as robot via bounding box 315 and label 320.

Network Architecture

Figure 4:
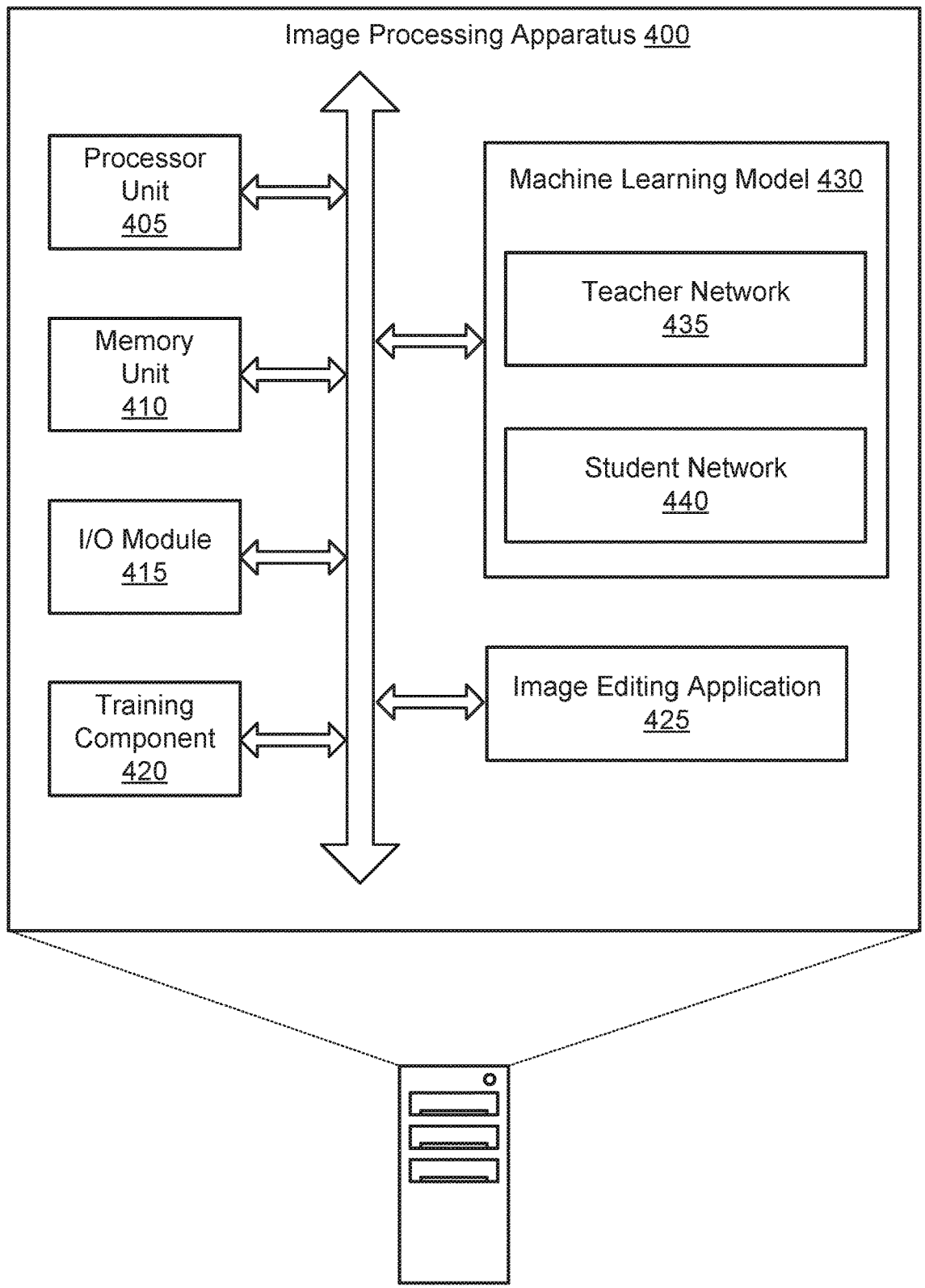
FIG. 4 shows an example of an image processing apparatus according to aspects of the present disclosure.
Figure 5:
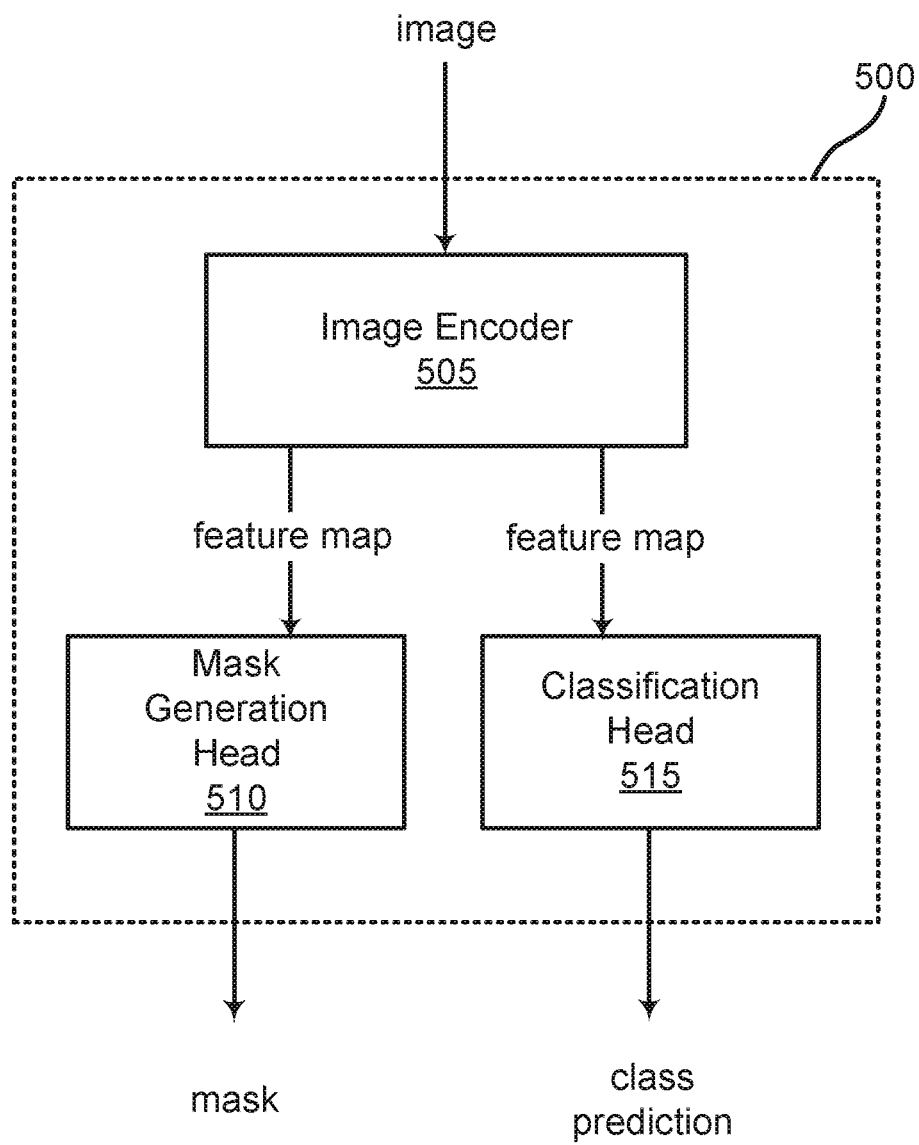
FIG. 5 shows an example of an image processing diagram according to aspects of the present disclosure.

In FIGS. 4-5, an apparatus and method for training a machine learning model are described. One or more embodiments of the apparatus and method include a teacher network configured to generate a pseudo mask for an object in an image based on text describing the object in the image; a student network configured to generate a mask for the object; and a training component configured to update parameters of the student network based on the mask and the pseudo mask.

In some examples, the teacher network includes a text encoder configured to encode the text describing the object to obtain a word embedding, wherein the pseudo mask is selected from a plurality of masks generated by the teacher network based on the word embedding.

In some examples, the training component includes a mapping component configured to map features corresponding to each of the plurality of masks into an embedding space of the word embedding.

In some examples, the student network comprises an image encoder, a mask generation head, and a classification head. In some examples, the teacher network comprises a region proposal network. Some examples of the apparatus and method further include an image editing application configured to edit the image based on the mask.

FIG. 4 shows an example of image processing apparatus 400 according to aspects of the present disclosure. The example shown includes image processing apparatus 400, processor unit 405, memory unit 410, I/O module 415, training component 420, image editing application 425, and machine learning model 430. In one embodiment, machine learning model 430 includes teacher network 435 and student network 440. Image processing apparatus 400 is an example of, or includes aspects of, the corresponding element described with reference to FIG. 1.

Processor unit 405 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 405 is configured to operate a memory array using a memory controller. In other cases, a memory controller is integrated into the processor. In some cases, processor unit 405 is configured to execute computer-readable instructions stored in a memory to perform various functions. In some embodiments, processor unit 405 includes special purpose components for modem processing, baseband processing, digital signal processing, or transmission processing.

Examples of memory unit 410 include random access memory (RAM), read-only memory (ROM), or a hard disk. Examples of memory unit 410 include solid state memory and a hard disk drive. In some examples, memory unit 410 is used to store computer-readable, computer-executable software including instructions that, when executed, cause a processor to perform various functions described herein. In some cases, memory unit 410 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 410 store information in the form of a logical state.

I/O module 415 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 415 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image processing apparatus 400 includes a computer implemented artificial neural network (ANN) for mask generation and class prediction for an object in an image. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image processing apparatus 400 includes a convolutional neural network (CNN) for image processing (e.g., class prediction for an object depicted in an image). CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 420 receives a training image and a caption for the training image, where the caption includes text describing an object in the training image. In some examples, training component 420 updates parameters of student network 440 based on the mask and the pseudo mask. In some examples, training component 420 maps the features corresponding to each of the set of candidate regions into an embedding space of the word embedding, where the comparison is based on the mapping.

In some examples, training component 420 receives an annotated training set, where an image in the annotated training set is associated with a ground truth object classification and a ground truth mask corresponding to the ground truth object classification. Training component 420 compares the object classification and the mask to the ground truth object classification and the ground truth mask, respectively. Training component 420 updates parameters of teacher network 435 based on the comparison. In some examples, the annotated training set does not include annotation data for the object in the training image.

In some examples, training component 420 compares the mask and the pseudo mask to obtain a detection loss, where the parameters of student network 440 are updated based on the detection loss. In some examples, training component 420 compares each of the sets of masks to a corresponding pseudo mask of the set of pseudo masks to obtain a detection loss, where the parameters of student network 440 are updated based on the detection loss. In some examples, training component 420 generates a modified version of the training image. In some examples, training component 420 computes a mask consistency score based on the additional pseudo mask and the pseudo mask, where a term of the detection loss is weighted based on the mask consistency score.

According to some embodiments, training component 420 is configured to update parameters of student network 440 based on the mask and the pseudo mask. In some examples, training component 420 includes a mapping component configured to map features corresponding to each of the set of masks into an embedding space of the word embedding.

According to some embodiments, image editing application 425 edits the image based on the mask.

According to some embodiments, machine learning model 430 receives an image that depicts an object. In some examples, machine learning model 430 generates a feature map for the image, where machine learning model 430 is trained using a pseudo mask generated by teacher network 435 for a training image based on a caption for the training image. Machine learning model 430 generates a mask based on the feature map, where the mask indicates a location of the object in the image.

In some examples, machine learning model 430 generates a class prediction for the object based on the feature map. In some examples, machine learning model 430 generates a set of masks based on the feature map, where the set of masks correspond to a set of objects in the image. Machine learning model 430 generates a class prediction for each of the set of masks.

According to some embodiments, teacher network 435 generates a pseudo mask for the object based on the text describing the object. In some examples, teacher network 435 encodes the text describing the object to obtain a word embedding. In some examples, teacher network 435 generates a set of candidate regions for the object. Teacher network 435 generates features corresponding to each of the set of candidate regions. Teacher network 435 compares the features corresponding to each of the set of candidate regions to the word embedding. Teacher network 435 selects a candidate region of the set of candidate regions based on the comparison, where the pseudo mask is based on the selected candidate region.

In some examples, teacher network 435 generates a set of masks for the object of the training image. Teacher network 435 generates exemplary features for the object based on the set of masks, where the pseudo mask is generated based on the exemplary features. In some examples, teacher network 435 generates an object classification and a mask corresponding to the object classification for the image.

In some examples, teacher network 435 generates a set of word embeddings corresponding to a set of objects in each of a set of captions. Teacher network 435 can generate a set of pseudo masks corresponding to the set of word embeddings. In some examples, teacher network 435 generates an additional pseudo mask for an object based on a modified version.

According to some embodiments, teacher network 435 is configured to generate a pseudo mask for an object in an image based on text describing the object in the image. In some examples, teacher network 435 includes a text encoder configured to encode the text describing the object to obtain a word embedding, where the pseudo mask is selected from a set of masks generated by teacher network 435 based on the word embedding. In some examples, the text encoder includes a BERT. In some examples, teacher network 435 includes a region proposal network. The region proposal network is configured to output bounding box coordinates corresponding to different regions of interest when an object is located in a region. Teacher network 435 is an example of, or includes aspects of, the corresponding element described with reference to FIGS. 9 and 11.

According to some embodiments, student network 440 generates a mask for the object. In some examples, student network 440 generates a set of masks corresponding to the set of objects. In some examples, student network 440 includes an image encoder, a mask generation head, and a classification head. Student network 440 is an example of, or includes aspects of, the corresponding element described with reference to FIGS. 5 and 9.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 5 shows an example of an image processing diagram according to aspects of the present disclosure. Student network 500 is an example of, or includes aspects of, the corresponding element described with reference to FIGS. 4 and 9. During inference, student network 500 is used to generate a mask based on feature map. Student network 500 generates a class prediction for the object based on the feature map. According to an embodiment, student network 500 includes image encoder 505, mask generation head 510, and classification head 515. As an example illustrated in FIG. 5, an image depicting an object is input to image encoder 505. Image encoder 505 generates a feature map for the image. The feature map is input to mask generation head 510 and classification head 515. Mask generation head 510 generates a mask based on the feature map where the mask indicates a location of the object in the image. Classification head 515 generates a class prediction for the object based on the feature map. In some examples, image encoder 505 includes a CNN to encode the image.

Image Processing

Figure 6:
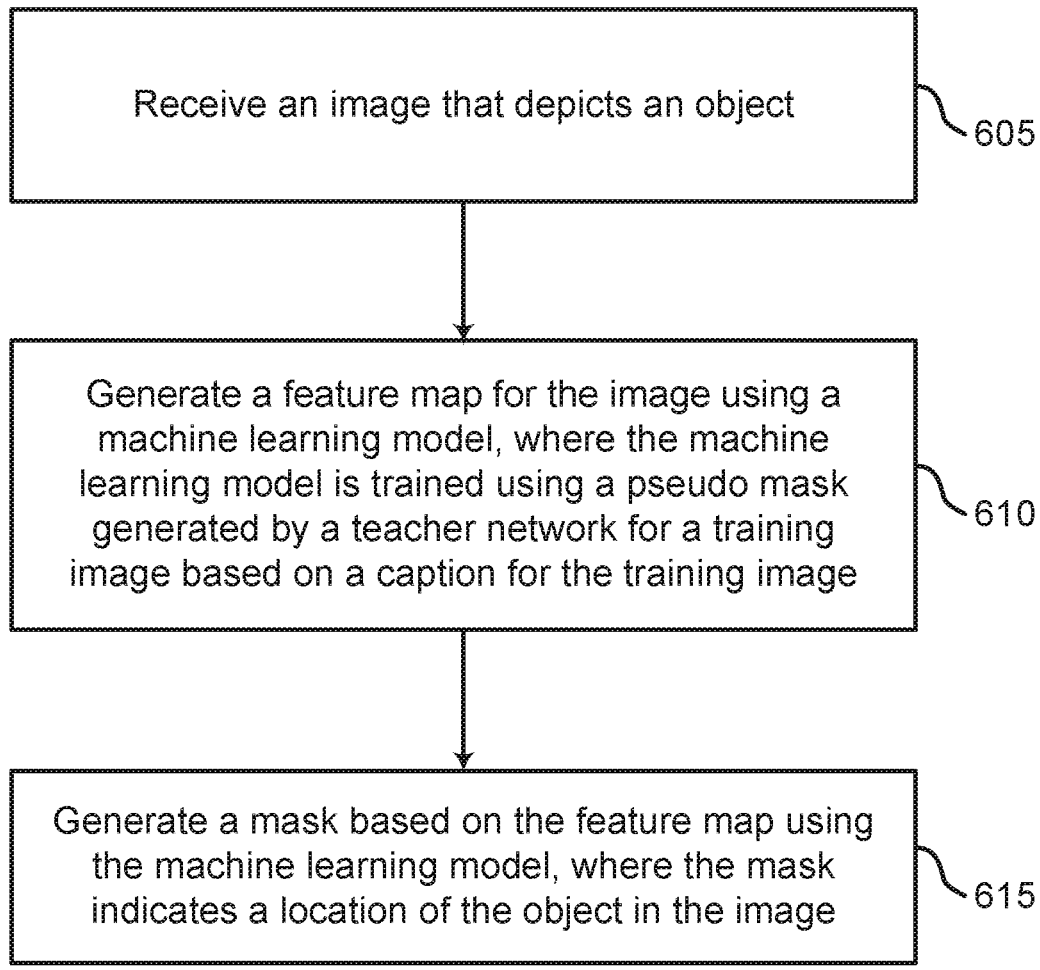
FIG. 6 shows an example of generating a mask corresponding to an object in an image according to aspects of the present disclosure.
Figure 7:
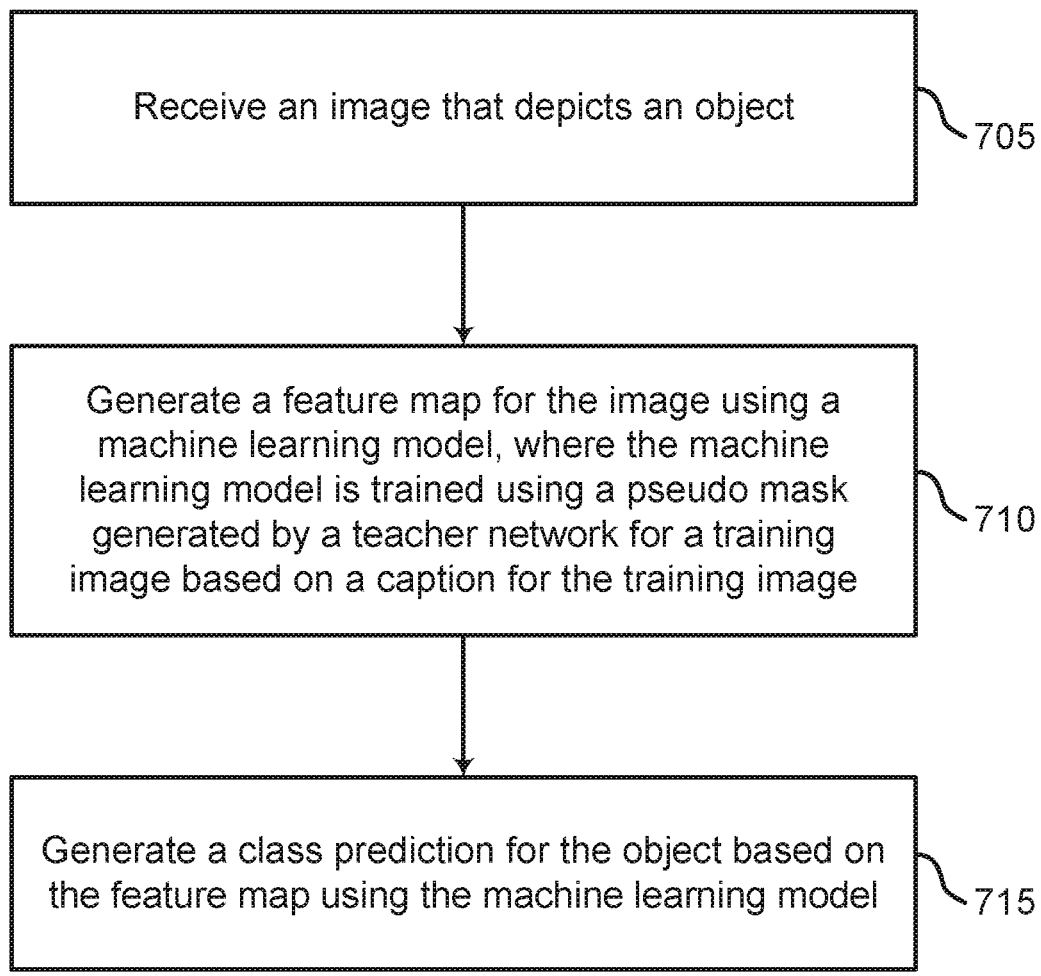
FIG. 7 shows an example of generating a class prediction for an object in an image according to aspects of the present disclosure.

In FIGS. 6-7, a method, apparatus, and non-transitory computer readable medium for image processing are described. One or more embodiments of the method, apparatus, and non-transitory computer readable medium include receiving an image that depicts an object; generating a feature map for the image using a machine learning model, wherein the machine learning model is trained using a pseudo mask generated by a teacher network for a training image based on a caption for the training image; and generating a mask based on the feature map using the machine learning model, wherein the mask indicates a location of the object in the image.

Some examples of the method, apparatus, and non-transitory computer readable medium further include generating a class prediction for the object based on the feature map using the machine learning model. Some examples of the method, apparatus, and non-transitory computer readable medium further include editing the image based on the mask.

Some examples of the method, apparatus, and non-transitory computer readable medium further include generating a plurality of masks based on the feature map, wherein the plurality of masks correspond to a plurality of objects in the image. Some examples of the method, apparatus, and non-transitory computer readable medium further include generating a class prediction for each of the plurality of masks.

FIG. 6 shows an example of generating a mask corresponding to an object in an image according to aspects of the present disclosure. In some examples, these operations are performed by a system including a processor executing a set of codes to control functional elements of an apparatus such as image processing apparatus 110 of FIG. 1. The student network described with regards to FIGS. 4 and 5 are used during inference time. The teacher network described in FIG. 4 is configured for training the student network. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system receives an image that depicts an object. In some cases, the operations of this step refer to, or may be performed by, machine learning model as described with reference to FIG. 4. In some examples, the student network described in FIGS. 4 and 5 is trained and used to generate a mask and for object detection during inference.

At operation 610, the system generates a feature map for the image using a machine learning model, where the machine learning model is trained using a pseudo mask generated by a teacher network for a training image based on a caption for the training image. In some cases, the operations of this step refer to, or may be performed by, machine learning model as described with reference to FIG. 4. As described above in FIG. 5, the student network includes an image encoder where the image encoder generates a feature map for the image.

At operation 615, the system generates a mask based on the feature map using the machine learning model, where the mask indicates a location of the object in the image. In some cases, the operations of this step refer to, or may be performed by, machine learning model as described with reference to FIG. 4.

Mask annotation is the process of labeling or classifying a mask of an image using text, annotation tools, or both to autonomously display the data feature. In some examples, a mask is a region of interest of the image (e.g., a cat object depicted in the image as shown in FIG. 1). Mask annotation may include multiple outputs for each object in an image such as bounding box, class label, prediction confidence score, and object mask outline and object mask. The bounding box represents region of interest for each detected object in the image. Class label is assigned to each detected object. Prediction confidence score is a score that evaluates how close the detected object is to the class label. Object mask outline is a polygon outline for the mask of each detected object in the image. Lastly, object mask is a polygon fill for the mask of each detected object in the image.

According to an embodiment, the student network generates mask output in the following steps. First, an image is run through a CNN to generate feature maps (e.g., an image encoder). Second, a multiple region of interest (ROI) is generated with detected objects in the image. Third, ROI outputs corresponding bounding boxes to the detected objects and the bounding boxes are warped into fixed dimensions. Lastly, warped features are fed into fully connected layers to make a classification. In addition, the warped features are fed into a mask classifier to generate a mask corresponding to an object.

FIG. 7 shows an example of generating a class prediction for an object in an image according to aspects of the present disclosure. The student network with regards to FIGS. 4 and 5 generates a class prediction for an object in an image. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system receives an image that depicts an object. In some cases, the operations of this step refer to, or may be performed by, machine learning model as described with reference to FIG. 4.

At operation 710, the system generates a feature map for the image using a machine learning model, where the machine learning model is trained using a pseudo mask generated by a teacher network for a training image based on a caption for the training image. In some cases, the operations of this step refer to, or may be performed by, machine learning model as described with reference to FIG. 4.

At operation 715, the system generates a class prediction for the object based on the feature map using the machine learning model. In some cases, the operations of this step refer to, or may be performed by, machine learning model as described with reference to FIG. 4. In some examples, the student network configured for object detection classifies objects in an image using categorical labels present in the image. Semantic segmentation refers to assignment of categories (e.g., vehicle, animal, etc.) to each pixel in an image. Instance segmentation refines semantic segmentation by detecting the instances of each category (e.g., detect multiple objects from a same class and identify them as distinct instances).

Training

In FIGS. 8-11, a method, apparatus, and non-transitory computer readable medium for training a neural network are described. One or more embodiments of the method, apparatus, and non-transitory computer readable medium include receiving a training image and a caption for the training image, wherein the caption includes text describing an object in the training image; generating a pseudo mask for the object using a teacher network based on the text describing the object; generating a mask for the object using a student network; and updating parameters of the student network based on the mask and the pseudo mask.

Some examples of the method, apparatus, and non-transitory computer readable medium further include encoding the text describing the object to obtain a word embedding. Some examples further include generating a plurality of candidate regions for the object using the teacher network. Some examples further include generating features corresponding to each of the plurality of candidate regions. Some examples further include comparing the features corresponding to each of the plurality of candidate regions to the word embedding. Some examples further include selecting a candidate region of the plurality of candidate regions based on the comparison, wherein the pseudo mask is based on the selected candidate region.

Some examples of the method, apparatus, and non-transitory computer readable medium further include mapping the features corresponding to each of the plurality of candidate regions into an embedding space of the word embedding, wherein the comparison is based on the mapping.

Some examples of the method, apparatus, and non-transitory computer readable medium further include generating a plurality of masks for the object of the training image using the teacher network. Some examples further include generating exemplary features for the object based on the plurality of masks, wherein the pseudo mask is generated based on the exemplary features.

Some examples of the method, apparatus, and non-transitory computer readable medium further include receiving an annotated training set, wherein an image in the annotated training set is associated with a ground truth object classification and a ground truth mask corresponding to the ground truth object classification. Some examples further include generating an object classification and a mask corresponding to the object classification for the image using the teacher network. Some examples further include comparing the object classification and the mask to the ground truth object classification and the ground truth mask, respectively. Some examples further include updating parameters of the teacher network based on the comparison.

In some examples, the annotated training set does not include annotation data for the object in the training image. Some examples of the method, apparatus, and non-transitory computer readable medium further include comparing the mask and the pseudo mask to obtain a detection loss, where the parameters of the student network are updated based on the detection loss.

Some examples of the method, apparatus, and non-transitory computer readable medium further include generating a plurality of word embeddings corresponding to a set of objects in each of a plurality of captions. Some examples further include generating a plurality of pseudo masks corresponding to the plurality of word embeddings using the teacher network. Some examples further include generating a plurality of masks corresponding to the set of objects using the student network. Some examples further include comparing each of the plurality of masks to a corresponding pseudo mask of the plurality of pseudo masks to obtain a detection loss, wherein the parameters of the student network are updated based on the detection loss.

Some examples of the method, apparatus, and non-transitory computer readable medium further include generating a modified version of the training image. Some examples further include generating an additional pseudo mask for the object based on the modified version. Some examples further include computing a mask consistency score based on the additional pseudo mask and the pseudo mask, wherein a term of the detection loss is weighted based on the mask consistency score.

Figure 8:
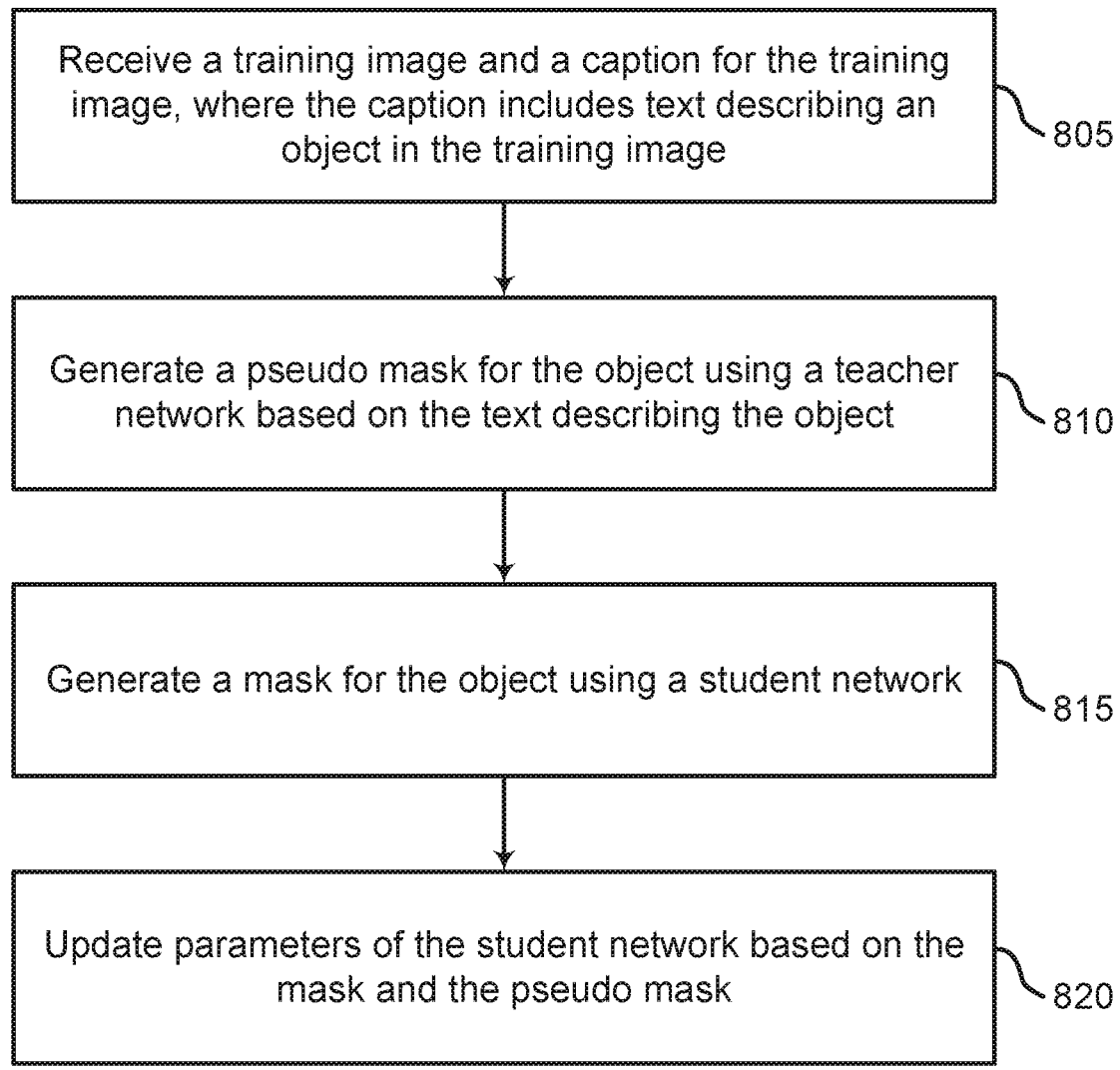
FIG. 8 shows an example of training a neural network according to aspects of the present disclosure.

FIG. 8 shows an example of training a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data comprising a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of the machine learning model are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 805, the system receives a training image and a caption for the training image, where the caption includes text describing an object in the training image. In some cases, the operations of this step refer to, or may be performed by, training component as described with reference to FIG. 4.

In some cases, Open Images dataset is used in training and testing. For example, the Open Images dataset includes 2 million instance masks for training and 20 thousand masks for testing in addition to Conceptual Captions dataset with 3.3 million captioned images. In some examples, the total 300 classes with mask annotations from the Open Images dataset are split into 200 seen classes ($V_B$) and 100 unseen classes ($V_C$). In some cases, an object may be identified from captions using word hierarchy.

At operation 810, the system generates a pseudo mask for the object using a teacher network based on the text describing the object. In some cases, the operations of this step refer to, or may be performed by, teacher network as described with reference to FIGS. 4, 9, and 11.

A pseudo mask is defined as a mask generated by a teacher network for each object appeared in a caption associated with an image. For example, the caption is "a black and white cat running on grass". The object in the caption is cat. A pseudo mask is generated for cat as follows. A text encoder converts the object "cat" in the caption to a word embedding. The teacher network then identifies a mask prediction whose visual feature is most compatible with the word embedding corresponding to the object (e.g., cat). That mask prediction is the pseudo mask for the object. In some cases, a pseudo mask may also be referred to as a pseudo label.

The present disclosure describes systems and methods for open vocabulary instance segmentation. The machine learning model (FIG. 4) is configured to detect and segment unseen classes given mask annotations from seen classes and captioned images (text describing objects). A self-training method (via student-teacher framework) enables learning from multiple classes mentioned in captions (text describing objects in an image) without mask annotations. The teacher network and the student network include embedding spaces that recognize unseen classes based on cosine similarity between visual features of region proposals and word embeddings of classes. According to an embodiment, the teacher network is trained on seen class annotations and can identify the class of an object based on an embedding space. Additionally, the teacher network can produce pseudo masks for captioned images based on noun phrases mentioned in the captions.

At operation 815, the system generates a mask for the object using a student network. In some cases, the operations of this step refer to, or may be performed by, student network as described with reference to FIGS. 4, 5, and 9. In some examples, a large number of captioned images (note captioned images can be collected easily) are used to train an object detector on a wide range of objects mentioned in captions. These captioned images do not have any mask annotations. According to an embodiment of the present disclosure, the image processing apparatus (FIG. 4) includes a student-teacher network where the teacher network translates high-level captioned annotations into pixel-wise mask annotations.

At operation 820, the system updates parameters of the student network based on the mask and the pseudo mask. In some cases, the operations of this step refer to, or may be performed by, training component as described with reference to FIG. 4. The student network is trained on ground-truth masks from seen classes and pseudo masks generated by the teacher network described above. According to some embodiments, an improved object detector covering both seen and unseen classes can be trained independent of costly mask annotations for unseen classes because the student network is exposed to a wide range of classes via pseudo masks for captioned images (i.e., objects mentioned in captions). Note captioned images with captions/tags are relatively cheap to collect. In some examples, the machine learning model (FIG. 4) is trained and evaluated on the Open Images dataset. The machine learning model increases performance on unseen classes while maintaining competitive performance on seen classes.

Figure 9:
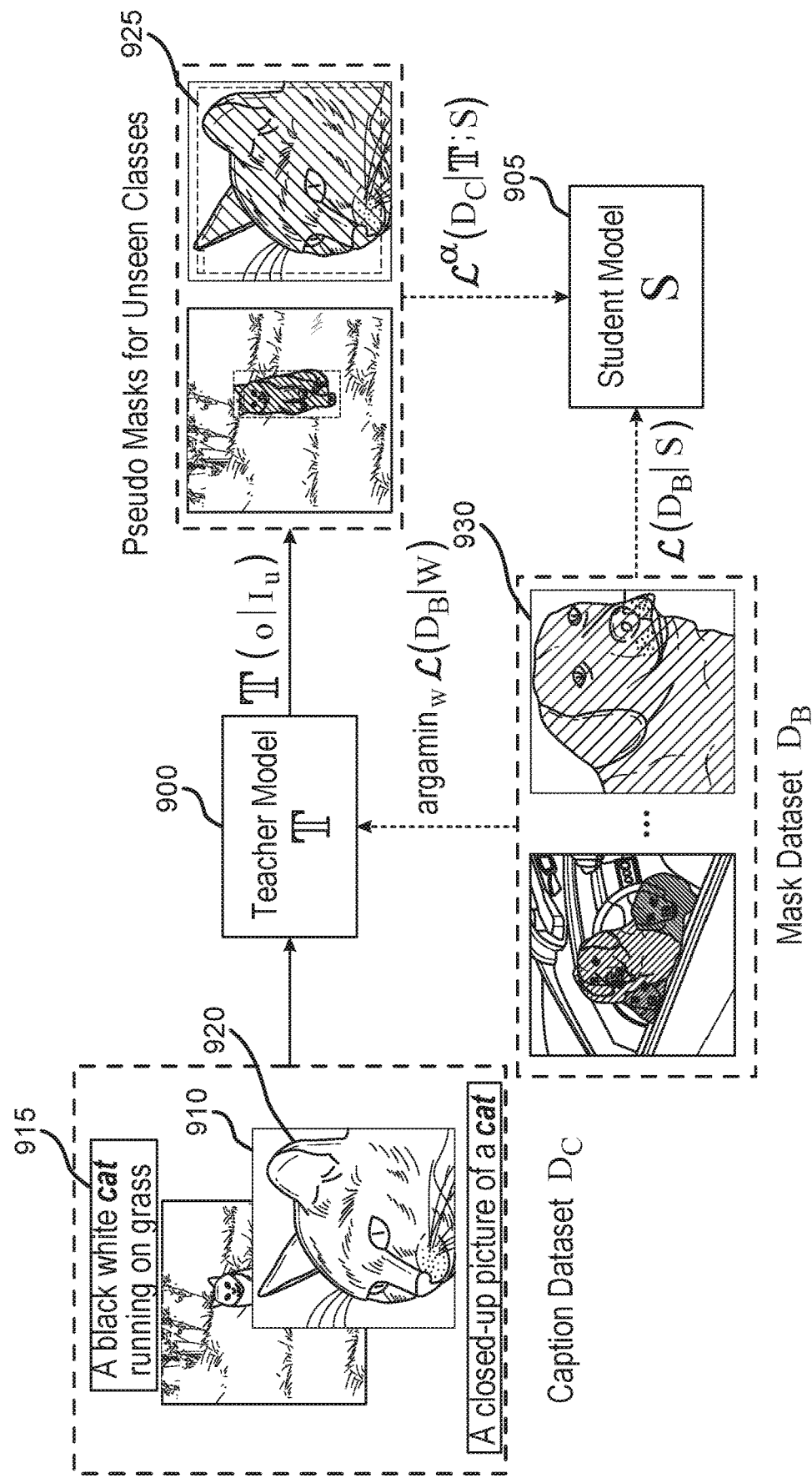
FIG. 9 shows an example of training a student network according to aspects of the present disclosure.

FIG. 9 shows an example of training student network 905 according to aspects of the present disclosure. Training component 420 described in FIG. 4 is used to train the student network. The example shown includes teacher network 900, student network 905, training image 910, caption 915, object 920, pseudo mask 925, and annotated training image 930. Teacher network 900 is an example of, or includes aspects of, the corresponding element described with reference to FIGS. 4 and 11. Student network 905 is an example of, or includes aspects of, the corresponding element described with reference to FIGS. 4 and 5. Pseudo mask 925 is an example of, or includes aspects of, the corresponding element described with reference to FIG. 11.

Let $\{I_i, \mathcal{Y}_i\}_{i \in D_B}$ be annotated training images 930 with mask annotations of a limited number of base classes $V_B$, where $I_i$ is a training image and $\mathcal{Y}_i$ is ground-truth instances in the training image. For each instance $y \in \mathcal{Y}_i$, a corresponding class $y_c$ is given, which belong to base classes $c \in V_B$, and the associated mask annotation $y_m$. In some cases, a set of captioned images $\{I_u, C_u\}_{u \in D_C}$ is used without any mask annotations to expand the set of classes the machine learning model can segment. Each object in caption 915 $o \in C_u$ belongs to a larger set of classes $o \in V_C$ with $|V_C| >> |V_B|$. As an example illustrated in FIG. 9, caption 915 states "a black white cat running on grass". Another example caption 915 states "a closed-up picture of a cat".

According to an embodiment, an open vocabulary object detector is trained based on a mask annotation dataset and a captioned dataset. In some cases, the open vocabulary object detector is trained based on mask dataset $D_B$ and captioned dataset $D_C$ to segment images containing target classes $c \in V_T$ without any training mask annotations, i.e., $V_T \cap V_B = \emptyset$.

According to an embodiment, the training component (FIG. 4) is configured to map an image into visual features to recognize target classes which are potentially unknown during training. In some cases, the mapping is done such that the probability of a mask m belonging to any class c corresponds to the inner project between the word embedding of the class and the mask feature:

$$p_W(c \mid m) = \sigma \langle v_c, f_m^W \rangle \; \forall \, m \in M_I \tag{1}$$

where $v_c$ is the word embedding of class c extracted from a pre-trained BERT model, $f_m^W$ is the visual features of the mask m, $W$ are learnable parameters of the open vocabulary object detector, and σ is the sigmoid function which normalizes prediction into (0, 1) range. In some examples, BERT model is pre-trained on Wikipedia. In some cases, a set of proposal masks, m∈ $M_I$, can be determined by a class agnostic mask head on object region proposals (for two-stage object detector) or on image pixels (for one stage object detector).

The open vocabulary object detector $W$ is trained on mask dataset $D_B$ via the detection loss, $\mathcal{L}(D_B|W)$:

$$\mathcal{L}(D_B | W) = \sum_{i \in D_B} \sum_{y \in \mathcal{Y}_i} \mathcal{L}_{det}(y | I_i; W) \quad (2)$$

$$\mathcal{L}_{Det}(y | I; W) = \mathcal{L}_{cls}(y_c | I; W) + \mathcal{L}_{mask}(y_m | I; W)$$

where $\mathcal{L}_{Det}$ (y|I; $W$) includes a classification loss $\mathcal{L}_{cls}$ and a mask loss $\mathcal{L}_{mask}$. $\mathcal{L}_{Det}$ (y|I; $W$) is the detection loss on image I for each ground-truth instance y∈ $\mathcal{Y}$.

As $W$ is only trained on mask dataset and $D_B$ includes a limited number of classes, $W$ may overfits on base classes $V_B$. Therefore, $D_B$ may not be able to generalize toward target classes $V_T$. Some embodiments of the present disclosure expand the detector knowledge beyond classes with mask annotations based on captioned images.

According to an embodiment, $T$ is teacher network 900 pre-trained on mask dataset: $T = argmin_W \mathcal{L}(D_B|W)$. In some examples, mask dataset $D_B$ includes annotated training images 930. Teacher network 900 generates mask prediction through constructing a pseudo mask 925 for each object o appeared in the caption $C_u$. For example, visual features of these mask prediction obtained are most compatible with the word embedding of object 920:

$$T(o | I_u) = argmax_{m \in M_{I_u}} \langle v_o, f_m^T \rangle \quad \forall o \in C_u \quad (3)$$

where $f_m^T$ is the visual feature of mask m from the set of predicted masks $M_{I_u}$ in image $I_u$ and $T(o|I_u)$ is pseudo mask 925 for object o corresponding to the most confident mask prediction of object 920.

Given pseudo masks 925 for each captioned image, student network $S$ (i.e., student network 905) is trained to minimize its prediction differences with the pseudo masks 925 as follows:

$$\mathcal{L}(D_C | T; S) = \sum_{u \in D_C} \sum_{o \in C_u} \mathcal{L}_{Det}(T(o|I_u)|I_u); S) \quad (4)$$

where $\mathcal{L}(D_C|T; S)$ is the detection loss on pseudo masks of captioned image. $\mathcal{L}(D_C|T; S)$ indicates the gap between student network 905 prediction capability and human knowledge encoded in captions 915. The detection loss is minimized to effectively expand student network 905 knowledge beyond teacher network 900 knowledge from limited base classes $V_B$ into a large number of classes in caption vocabulary $V_C$.

In some embodiments, an objective function is optimized on base classes $D_B$, given a pre-trained teacher network $T$ to learn student network 905 (or parameters of the student network 905):

$$S* = argmin_S \mathcal{L}(D_B|S) + \mathcal{L}^\alpha(D_C|T; S) \quad (5)$$

$\mathcal{L}^\alpha(D_C|T; S)$ and consistency of each pseudo mask to adjust effect of the masks on the student network by weighting the detection loss on captioned images will be described in greater detail in FIG. 11. Student network 905 is exposed to additional knowledge from caption dataset $D_C$ such that student network 905 generalizes better to unseen classes. In some examples, student network 905 can be used to train another student network. That is, student network 905 may become an intermediate teacher network used to guide training of the another student network to be used at inference time.

Figure 10:
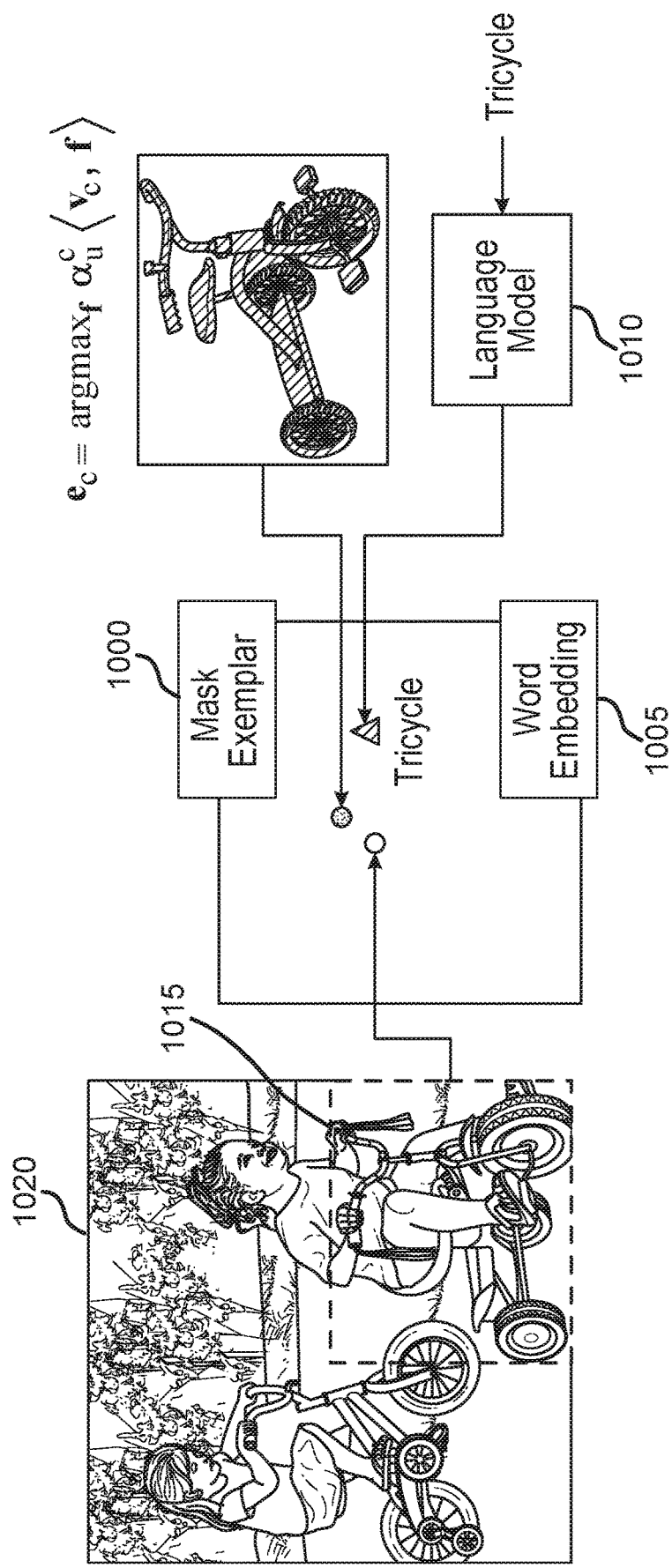
FIG. 10 shows an example of generating a pseudo mask for an object using a teacher network based on mask exemplar according to aspects of the present disclosure.

FIG. 10 shows an example of generating a pseudo mask for an object using a teacher network based on mask exemplar 1000 according to aspects of the present disclosure. The example shown includes mask exemplar 1000, word embedding 1005, language model 1010, bounding box 1015, and image 1020. Bounding box 1015 is an example of, or includes aspects of, the corresponding element described with reference to FIG. 3.

The student network is trained to operate in an open vocabulary setting. In some cases, the student network generates prediction based on the inner product between visual features and word embeddings 1005 following the above Equation 1. For example, word embeddings 1005 provide coarse semantic information about new/unseen classes without annotations. These word embeddings 1005 might not encode fine-grained visual information for each class.

A word embedding is a learned representation for text where words that have the same meaning have a similar representation. Glove and Word2vec are examples of systems for obtaining a vector representation of words. GloVe is an unsupervised algorithm for training a network using aggregated global word-word co-occurrence statistics from a corpus. Similarly, a Word2vec model may include a shallow neural network trained to reconstruct the linguistic context of words. GloVe and Word2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words.

To capture visual details missing in word embedding 1005, the image processing network collects mask exemplars 1000. For example, mask exemplars 1000 are the mask features f having highest mask consistency and prediction confidence across all the captioned images:

$$e_c = argmax_f \alpha_f^c \langle v_c, f \rangle \quad \forall c \in V_C \quad (6)$$

$$\text{s.t. } f \in \{f_m^T | m \in M_{I_u}; c \in C_u\}_{u \in D_C}$$

where $e_c$ is mask exemplar 1000 for class c from captioned dataset $D_C$. In some examples, the word "tricycle" is input to language model 1010 to obtain a corresponding word embedding 1005. In some examples, "airplane" is input to language model 1010 to obtain a corresponding word embedding 1005. Airplane is a seen class. Tricycle is an unseen class.

Mask exemplars 1000 are used directly to inject fine-grained visual details into class embeddings with the mask exemplars $e_c$ residing in the same inner product space of word embedding $v_c$. In some cases, mask exemplars 1000 are used to improve predictions (e.g., accuracy, efficiency) of the student network during inference time as follows:

$$p_{\mathbb{S}}(c \mid m) = \begin{cases} \sigma\langle \lambda e_c + (1-\lambda) v_c, f_m^{\mathbb{S}} \rangle & \text{if } c \in V_C \\ \sigma\langle v_c, f_m^{\mathbb{S}} \rangle & \text{otherwise} \end{cases} \qquad (7)$$

where $f_m^{\mathbb{S}}$ is mask features from the student model and $\lambda$ is a non-negative scalar which trades off high-level semantic information from word embeddings 1005 with fine visual details from mask exemplars 1000. In some examples, at training, the image processing network can collect high-confidence samples (i.e., high probability) and use them as exemplars to identify objects from a same class.

Figure 11:
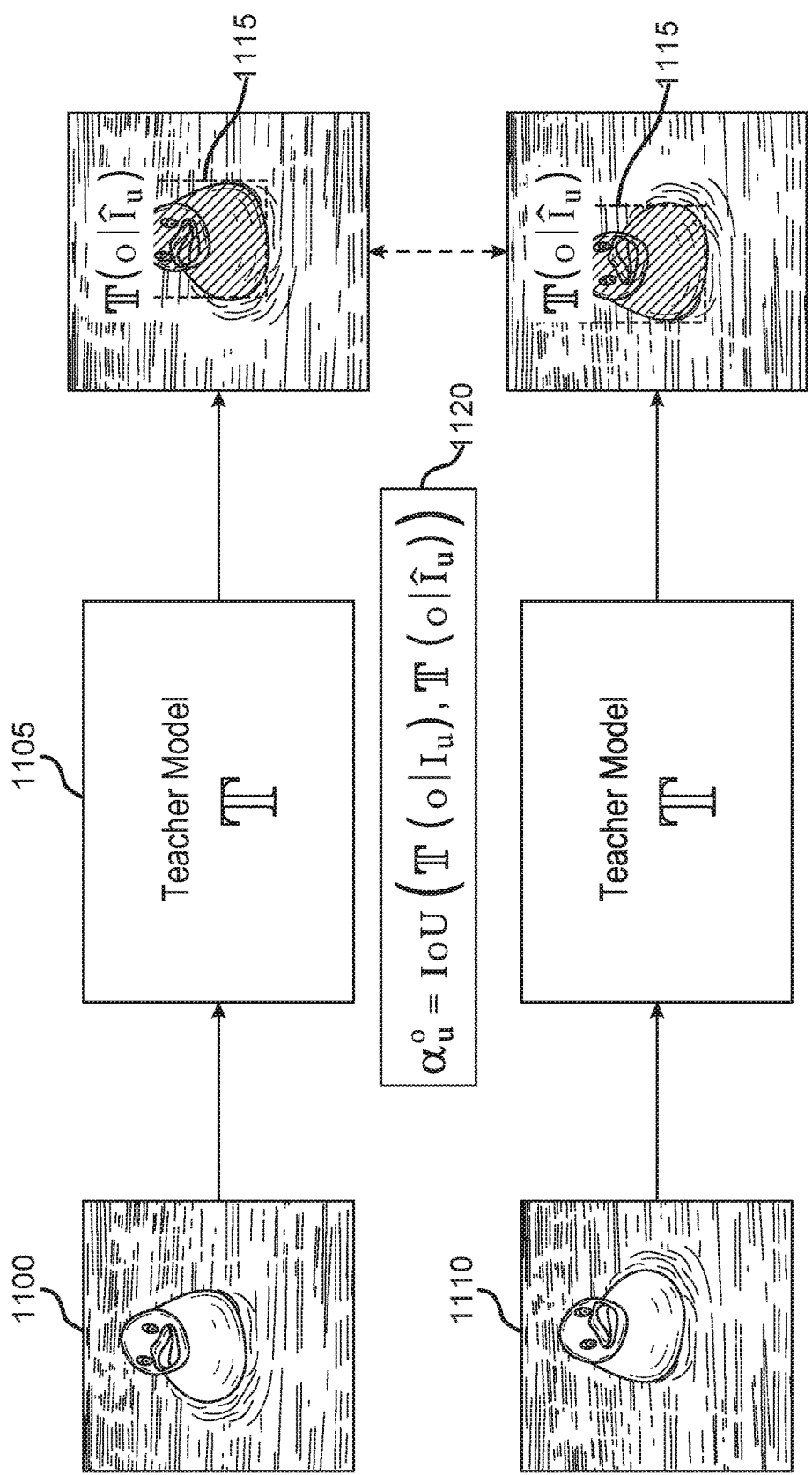
FIG. 11 shows an example of computing a mask consistency score according to aspects of the present disclosure.

FIG. 11 shows an example of computing mask consistency score 1120 according to aspects of the present disclosure. The example shown includes image 1100, teacher network 1105, modified image 1110, pseudo mask 1115, and mask consistency score 1120. In some cases, pseudo mask quality and its impact on prediction consistency are evaluated.

Teacher network 1105 is an example of, or includes aspects of, the corresponding element described with reference to FIGS. 4 and 9. Pseudo mask 1115 is an example of, or includes aspects of, the corresponding element described with reference to FIG. 9.

According to an embodiment of the present disclosure, the network model is configured based on quality of pseudo masks for prediction consistency. In some cases, pseudo masks might not accurately describe objects in captions. As a result, pseudo mask quality is evaluated to adjust the influence of the mask on the student network. One example is to threshold masks based on their confidences: $p_{\mathbb{T}}(o|m)$. However, as teacher network $\mathbb{T}$ is exclusively trained on base classes, low confidence predictions are obtained on a new or unseen object, $o \notin V_B$. Thus, thresholding uncertain predictions would omit most masks from new objects needed to expand student network knowledge.

The consistency of mask predictions is measured. In some cases, the consistency is measured across different image augmentation operations as a proxy for mask quality. Let $\hat{I}_u$ be a modified image 1110 created by applying horizontal flip and brightness adjustment on a captioned image $I_u$ (i.e., image 1100). The mask consistency score 1120 is estimated using intersection over union or IoU, between predictions from $I_u$ and $\hat{I}_u$ for each object $o \in C_u$:

$$\alpha_u^o = IoU\big(\mathbb{T}(o \mid I_u), \mathbb{T}(o \mid \hat{I}_u)\big) \; \forall \, o \in C_u \qquad (8)$$

In some cases, high consistency $\alpha$ indicates that pseudo mask 1115 is less likely a random prediction. For example, high consistency pseudo masks often correspond to simple images where objects can be distinguished from each other.

In some examples, consistency of pseudo mask 1115 is used to adjust the effect of the masks on the student network by weighting the detection loss on captioned images as follows:

$$\mathcal{L}^\alpha(D_C \mid \mathbb{T}; \mathbb{S}) = \sum_{u \in D_C} \sum_{o \in C_i} \alpha_u^o \mathcal{L}_{Det}(\mathbb{T}(o \mid I_u) \mid I_u; \mathbb{S}) \qquad (9)$$

Performance of apparatus, systems and methods of the present disclosure have been evaluated, and results indicate embodiments of the present disclosure have obtained increased performance over existing technology. Example experiments demonstrate that the image processing apparatus outperforms conventional systems.

The image processing network has increased performances on both seen and unseen classes by expanding student network knowledge on captioned images from Open Images dataset. Ablation study is conducted to show the effectiveness of the apparatus and methods (i.e., knowledge expansion, mask exemplars, and mask consistency). The image processing network has increased accuracy for seen and unseen class segmentation due to knowledge expansion, mask consistency, and mask exemplars.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for training a neural network, comprising:
    obtaining a teacher network, wherein the teacher network is trained using a first training set comprising ground-truth mask data;
    receiving a second training set different from the first training set, wherein the second training set comprises a training image and a caption for the training image, wherein the caption includes text describing an object in the training image, and wherein the object has an unseen class absent from the first training set;

generating a pseudo mask for the object having the unseen class using the teacher network based on the text describing the object;
generating a mask for the object having the unseen class using a student network separate from the teacher network;
comparing the pseudo mask from the teacher network and the mask from the student network to obtain a detection loss; and
updating parameters of the student network based on the detection loss.

2. The method of claim 1, further comprising:
encoding the text describing the object to obtain a word embedding;
generating a plurality of candidate regions for the object using the teacher network;
generating features corresponding to each of the plurality of candidate regions;
comparing the features corresponding to each of the plurality of candidate regions to the word embedding; and
selecting a candidate region of the plurality of candidate regions based on the comparison, wherein the pseudo mask is generated based on the selected candidate region.

3. The method of claim 2, further comprising:
mapping the features corresponding to each of the plurality of candidate regions into an embedding space of the word embedding, wherein the comparison is based on the mapping.

4. The method of claim 1, further comprising:
generating a plurality of masks for the object of the training image using the teacher network; and
generating exemplary features for the object based on the plurality of masks, wherein the pseudo mask is generated based on the exemplary features.

5. The method of claim 1, further comprising:
receiving an annotated training set, wherein an image in the annotated training set is associated with a ground truth object classification and a ground truth mask corresponding to the ground truth object classification;
generating an object classification and a mask corresponding to the object classification for the image using the teacher network;
comparing the object classification and the mask to the ground truth object classification and the ground truth mask, respectively; and
updating parameters of the teacher network based on the comparison.

6. The method of claim 1, further comprising:
generating a plurality of word embeddings corresponding to a set of objects in each of a plurality of captions;
generating a plurality of pseudo masks corresponding to the plurality of word embeddings using the teacher network;
generating a plurality of masks corresponding to the set of objects using the student network; and
comparing each of the plurality of masks to a corresponding pseudo mask of the plurality of pseudo masks to obtain the detection loss, wherein the parameters of the student network are updated based on the detection loss.

7. The method of claim 6, further comprising:
generating a modified version of the training image;
generating an additional pseudo mask for the object based on the modified version; and
computing a mask consistency score based on the additional pseudo mask and the pseudo mask, wherein a term of the detection loss is weighted based on the mask consistency score.

8. An apparatus for training a machine learning model, comprising:
a teacher network configured to generate a pseudo mask for an object having an unseen class in a training image based on text describing the object in the training image, wherein the teacher network is trained using a first training set comprising ground-truth mask data, and wherein the teacher network receives a second training set different from the first training set, the second training set comprises the training image and a caption for the training image, the caption includes the text describing the object in the training image, and wherein the object has the unseen class absent from the first training set;
a student network configured to generate a mask for the object having the unseen class, wherein the student network is separate from the teacher network; and
a training component configured to compare the pseudo mask from the teacher network and the mask from the student network to obtain a detection loss, and to update parameters of the student network based on the detection loss.

9. The apparatus of claim 8, wherein:
the teacher network includes a text encoder configured to encode the text describing the object to obtain a word embedding, wherein the pseudo mask is selected from a plurality of masks generated by the teacher network based on the word embedding.

10. The apparatus of claim 9, wherein:
the training component includes a mapping component configured to map features corresponding to each of the plurality of masks into an embedding space of the word embedding.

11. The apparatus of claim 8, wherein:
the student network comprises an image encoder, a mask generation head, and a classification head.

12. The apparatus of claim 8, wherein:
the teacher network comprises a region proposal network.

13. The apparatus of claim 8, further comprising:
an image editing application configured to edit the training image based on the mask.

14. A non-transitory computer readable medium storing code for training a machine learning model, the code comprising instructions executable by at least one processor to:
obtain a teacher network, wherein the teacher network is trained using a first training set comprising ground-truth mask data;
receive a second training set different from the first training set, wherein the second training set comprises a training image and a caption for the training image, wherein the caption includes text describing an object in the training image, and wherein the object has an unseen class absent from the first training set;
generate a pseudo mask for the object having the unseen class using the teacher network based on the text describing the object;
generate a mask for the object having the unseen class using a student network separate from the teacher network;
compare the pseudo mask from the teacher network and the mask from the student network to obtain a detection loss; and update parameters of the student network based on the detection loss.

15. The non-transitory computer readable medium of claim 14, the code further comprising instructions executable by the at least one processor to:
encode the text describing the object to obtain a word embedding;
generate a plurality of candidate regions for the object using the teacher network;
generate features corresponding to each of the plurality of candidate regions;
compare the features corresponding to each of the plurality of candidate regions to the word embedding; and
select a candidate region of the plurality of candidate regions based on the comparison, wherein the pseudo mask is generated based on the selected candidate region.

16. The non-transitory computer readable medium of claim 14, the code further comprising instructions executable by the at least one processor to:
generate a plurality of masks for the object of the training image using the teacher network; and
generate exemplary features for the object based on the plurality of masks, wherein the pseudo mask is generated based on the exemplary features.

17. The non-transitory computer readable medium of claim 14, the code further comprising instructions executable by the at least one processor to:
receive an annotated training set, wherein an image in the annotated training set is associated with a ground truth object classification and a ground truth mask corresponding to the ground truth object classification;
generate an object classification and a mask corresponding to the object classification for the image using the teacher network;
compare the object classification and the mask to the ground truth object classification and the ground truth mask, respectively; and
update parameters of the teacher network based on the comparison.

18. The non-transitory computer readable medium of claim 14, the code further comprising instructions executable by the at least one processor to:
generate a plurality of word embeddings corresponding to a set of objects in each of a plurality of captions;
generate a plurality of pseudo masks corresponding to the plurality of word embeddings using the teacher network;
generate a plurality of masks corresponding to the set of objects using the student network; and
compare each of the plurality of masks to a corresponding pseudo mask of the plurality of pseudo masks to obtain the detection loss, wherein the parameters of the student network are updated based on the detection loss.

* * * * *